(12) United States Patent
Chow

(10) Patent No.: US 11,366,574 B2
(45) Date of Patent: Jun. 21, 2022

(54) HUMAN-MACHINE CONVERSATION METHOD, CLIENT, ELECTRONIC DEVICE, AND STORAGE MEDIUM

(71) Applicant: Alibaba Group Holding Limited, Grand Cayman (KY)

(72) Inventor: Ming Hon Chow, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 17/052,271

(22) PCT Filed: Apr. 26, 2019

(86) PCT No.: PCT/CN2019/084520
§ 371 (c)(1),
(2) Date: Nov. 2, 2020

(87) PCT Pub. No.: WO2019/214463
PCT Pub. Date: Nov. 14, 2019

(65) Prior Publication Data
US 2021/0048930 A1   Feb. 18, 2021

(30) Foreign Application Priority Data
May 7, 2018   (CN) .......................... 201810426209.2

(51) Int. Cl.
*G06F 3/0484*   (2022.01)
*G06F 3/16*   (2006.01)
(Continued)

(52) U.S. Cl.
CPC .............. *G06F 3/0484* (2013.01); *G06F 3/16* (2013.01); *H04L 67/10* (2013.01); *H04L 51/02* (2013.01)

(58) Field of Classification Search
CPC ......... G06F 3/0484; G06F 3/16; H04L 67/10; H04L 51/02
See application file for complete search history.

(56) References Cited

U.S. PATENT DOCUMENTS

| 5,204,905 A | 4/1993 | Mitome |
| 5,642,519 A | 6/1997 | Martin |

(Continued)

FOREIGN PATENT DOCUMENTS

| CN | 106202159 A | 12/2016 |
| CN | 106326307 A | 1/2017 |

(Continued)

OTHER PUBLICATIONS

Translation of International Search Report to corresponding International Application No. PCT/CN2019/084520 dated Jul. 18, 2019 (1 page).

(Continued)

*Primary Examiner* — Seth A Silverman
(74) *Attorney, Agent, or Firm* — James J. DeCarlo; Greenberg Traurig, LLP

(57) ABSTRACT

Embodiments of the disclosure disclose a human-machine conversation method, a client, an electronic device, and a storage medium. The method comprises: providing a human-machine conversation interface; displaying, upon receiving first input, input information of a user; displaying, in response to the input information, a response result; displaying, upon receiving second input, a function identifier based on the second input, a service function corresponding to the function identifier being configured to respond to the input information; and determining, upon receiving third input, a target function identifier based on the third input, the target function identifier indicating a service function for responding to the input information.

20 Claims, 10 Drawing Sheets

(51) Int. Cl.
*H04L 67/10* (2022.01)
*H04L 51/02* (2022.01)

(56) References Cited

U.S. PATENT DOCUMENTS

| | | | |
|---|---|---|---|
| 5,794,050 | A | 8/1998 | Dahlgren et al. |
| 5,890,123 | A | 3/1999 | Brown et al. |
| 6,243,678 | B1 | 6/2001 | Erhart et al. |
| 6,434,524 | B1 | 8/2002 | Weber |
| 6,539,353 | B1 | 3/2003 | Jiang et al. |
| 6,587,822 | B2 | 7/2003 | Brown et al. |
| 8,041,570 | B2 | 10/2011 | Mirkovic et al. |
| 8,874,443 | B2 | 10/2014 | Weng et al. |
| 9,626,955 | B2 | 4/2017 | Fleizach et al. |
| 2001/0004829 | A1 | 6/2001 | Liebig |
| 2010/0057463 | A1* | 3/2010 | Weng ............... G06F 40/20 704/257 |
| 2010/0198595 | A1 | 8/2010 | Wlasiuk |
| 2011/0055256 | A1* | 3/2011 | Phillips ............ G10L 15/30 707/769 |
| 2011/0224982 | A1 | 9/2011 | Acero et al. |
| 2017/0289766 | A1* | 10/2017 | Scott ............... H04W 4/023 |
| 2018/0011687 | A1* | 1/2018 | Imagawa .......... G06F 21/84 |

FOREIGN PATENT DOCUMENTS

| | | |
|---|---|---|
| CN | 107870994 A | 4/2018 |
| EP | 3154052 A1 | 4/2017 |
| WO | 2002049253 A2 | 6/2002 |

OTHER PUBLICATIONS

Extended EP Search Report dated Dec. 23, 2021 in corresponding EP Application No. 19799790.1 (10 pages).

* cited by examiner

HUMAN-MACHINE CONVERSATION METHOD, CLIENT, ELECTRONIC DEVICE, AND STORAGE MEDIUM

CROSS-REFERENCE TO RELATED APPLICATIONS

The present application is a national stage entry of Int'l Appl. No. PCT/CN2019/084520, filed on Apr. 26, 2019, which claims priority to the Chinese Patent Application No. 201810426209.2, filed on May 7, 2018, both of which are incorporated by reference herein in their entirety.

BACKGROUND

Technical Field

The disclosure relates to the field of Internet technologies, and in particular, to methods, electronic devices, and storage media for human-machine conversations.

Description of Related Art

Presently, an ever-growing number of human-machine conversation robots or software applications have emerged, such as Xiaobing, an intelligent chatbot designed by Microsoft Corp. of Redmond, Wash. Users can input messages using a client to engage in a human-machine conversation. However, in a human-machine conversation, result information fed back by a machine oftentimes fails to respond to the message input by the user, leading to relatively poor user experiences. For example, when a user inputs "search air tickets from Suzhou to Beijing" to search for, and correspondingly purchase, air tickets, a machine responds with the information of the user's past purchase orders involving air tickets.

SUMMARY

Embodiments of the disclosure provide human-machine conversation methods, clients, electronic devices, and storage media for improved overall user experience.

In one embodiment, the disclosure provides a human-machine conversation method applied to a client. The method comprises: providing a human-machine conversation interface; upon receiving first input, displaying input information of a user; displaying a response result for the input information; upon receiving second input, displaying at least one function identifier based on the second input, wherein a service function indicated by the function identifier is used for responding to the input information; and upon receiving third input, determining a target function identifier based on the third input, wherein a service function indicated by the target function identifier is used for responding to the input information.

In one embodiment, the disclosure provides a client, comprising: a display module and a processing module. The display module is configured to provide a human-machine conversation interface. The processing module is configured to: upon receiving first input, display input information of a user; display a response result for the input information; upon receiving a second input, display at least one function identifier based on the second input, wherein a service function indicated by the function identifier is used for responding to the input information; and upon receiving third input, determine a target function identifier based on the third input, wherein a service function indicated by the target function identifier is used for responding to the input information.

In one embodiment, the disclosure provides an electronic device comprising: a display and a processor. The display is configured to provide a human-machine conversation interface. The processor is configured to: upon receiving first input, display input information of a user; display a response result of the input information; upon receiving a second input, display at least one function identifier based on the second input, wherein a service function indicated by the function identifier is used for responding to the input information; and upon receiving third input, determine a target function identifier based on the third input, wherein a service function indicated by the target function identifier is used for responding to the input information.

In one embodiment, the disclosure provides a computer-readable storage medium configured to store computer program instructions, the computer-readable storage medium comprising program instructions for performing: providing a human-machine conversation interface; upon receiving first input, displaying input information of a user; displaying a response result of the input information; upon receiving second input, displaying at least one function identifier based on the second input wherein a service function indicated by the function identifier is used for responding to the input information; and upon receiving third input, determining a target function identifier based on the third input, wherein a service function indicated by the target function identifier is used for responding to the input information.

In one embodiment, the disclosure provides a human-machine conversation method applied at a client, the method comprising: providing a human-machine conversation interface; upon receiving user input, displaying input information of a user; displaying a response result for the input information; when no user input is received within a specified time duration, displaying at least one function identifier, wherein a service function indicated by the function identifier is used for responding to the input information; determining a target function identifier based on the user input; and responding to the input information based on a service function indicated by the target function identifier.

In one embodiment, the disclosure provides a client, the client comprising: a display module and a processing module. The display module is configured to: provide a human-machine conversation interface; upon receiving user input, display input information of a user; display a response result for the input information; and when no user input is received within a specified time duration, display at least one function identifier, wherein a service function indicated by the function identifier is used for responding to the input information. The processing module is configured to determine a target function identifier based on the user input; and respond to the input information based on a service function indicated by the target function identifier.

In one embodiment, the disclosure provides an electronic device, the electronic device comprising: a display and a processor. The display is configured to: provide a human-machine conversation interface; upon receiving user input, display input information of a user; display a response result for the input information; and when no user input is received within a specified time duration, display at least one function identifier, wherein a service function indicated by the function identifier is used for responding to the input information. The processor is configured to determine a target function identifier based on the user input; and respond to the input information based on a service function indicated by the target function identifier.

In one embodiment, the disclosure provides a computer-readable storage medium configured to store computer program instructions, the computer-readable storage medium comprising program instructions for performing: providing a human-machine conversation interface; upon receiving user input, displaying input information of a user; displaying a response result for the input information; when no user input is received within a specified time duration, displaying at least one function identifier, wherein a service function indicated by the function identifier is used for responding to the input information; determining a target function identifier based on the user input; and responding to the input information based on a service function indicated by the target function identifier.

In one embodiment, the disclosure provides a method for service function activation, applied at a server, the method comprising: receiving first input information, provided by a client, of a user on a human-machine conversation interface of the client; sending a response result to the client based on the input information; receiving second input information provided by the client; providing at least one function identifier to the client, wherein a service function indicated by the function identifier is used for responding to the input information; and activating a corresponding service function based on a target function identifier determined based on user input of the client.

In one embodiment, the disclosure provides an electronic device, the electronic device comprising: a network communication unit and a processor. The network communication unit is configured to: receive first input information, provided by a client, of a user on a human-machine conversation interface of the client; send a response result to the client based on the input information; and receive second input information provided by the client. The processor is configured to provide at least one function identifier to the client, wherein a service function indicated by the function identifier is used for responding to the input information; and activate a corresponding service function based on a target function identifier determined based on user input of the client.

In one embodiment, the disclosure further provides a computer-readable storage medium configured to store computer program instructions, the computer-readable storage medium comprising program instructions for performing: receiving first input information, provided by a client, of a user on a human-machine conversation interface of the client; sending a response result to the client based on the input information; receiving second input information provided by the client; providing at least one function identifier to the client, wherein a service function indicated by the function identifier is used for responding to the input information; and activating a corresponding service function based on a target function identifier that is determined based on user input of the client.

Embodiments of the disclosure provide human-machine conversation methods, clients, electronic devices, and computer storage media to enable a human-machine conversation interface. Upon receiving first input of a user, input information of the user is displayed; and a response result for the input information is displayed. Upon receiving a second input, at least one function identifier based on the second input is displayed, wherein a service function indicated by the function identifier is used for responding to the input information. Upon receiving third input, a target function identifier is determined based on the third input, wherein a service function indicated by the target function identifier is used for responding to the input information. This way, in a human-machine conversation, when the user finds that the machine cannot identify his/her intent or misunderstands his/her intent, a function identifier is selected to determine a corresponding service function to respond to the input information, thereby raising the possibility of the machine understanding the user's intent in the human-machine conversation, and enhancing user experience.

BRIEF DESCRIPTION OF THE DRAWINGS

The drawings to be used for the description of the embodiments are introduced briefly in the following. The drawings are merely some embodiments of the disclosure, and those of ordinary skill in the art may obtain other drawings according to these accompanying drawings without significant efforts.

DETAILED DESCRIPTION

Figure 1:
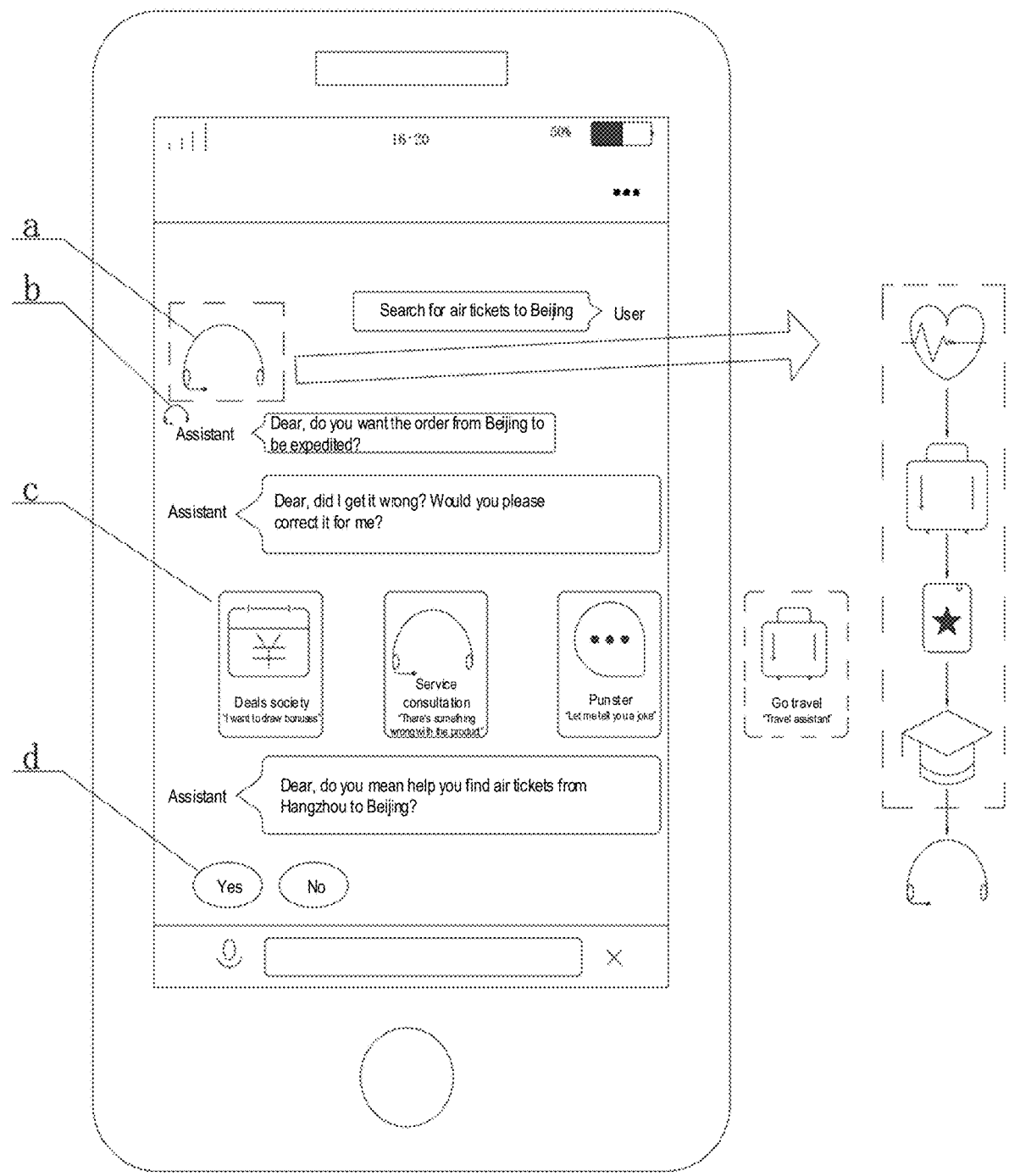
FIG. 1 is a diagram illustrating a user interface for human-machine conversations according to some embodiments of the disclosure.

To enable those skilled in the art to better understand the technical solutions of the disclosure, the technical solutions in the embodiments of the disclosure will be described clearly and completely below with reference to the drawings in the embodiments of the disclosure. The described embodiments are merely some, rather than all of the embodiments of the disclosure. Based on the embodiments of the disclosure, all other embodiments obtained by those of ordinary skill in the art without significant efforts shall fall within the scope of the disclosure.

Embodiments of the disclosure provide human-machine conversation systems. According to various embodiments, a human-machine conversation system includes a client and a server.

In some embodiments, the client includes a desktop computer, a tablet computer, a notebook computer, a smartphone, a digital assistant, a smart wearable device, or the like. A smart wearable device may include a smart bracelet, a smartwatch, smart glasses, a smart helmet, or the like. In other embodiments, the client, not limited to the above-described tangible electronic devices, includes software executing at the above-described electronic devices.

In some embodiments, the client is configured to provide a human-machine conversation interface. The human-machine conversation interface is configured to, upon receiving user input, display input information of a user; and display a response result for the input information. The human-machine conversation interface is further configured to display, upon receiving second input, at least one function identifier based on the second input, a service function indicated by the function identifier being used for responding to the input information. The human-machine conversation interface is further configured to, upon receiving third input, determine a target function identifier based on the third input, a service function indicated by the target function identifier being used for responding to the input information. Further, the client is configured to perform data interaction with the server, which is configured to receive data or the like sent from the client and respond to obtain output information based on a service function corresponding to a target function identifier selected by the user. Subsequently, the server sends the output information to the client for display to the user.

In some embodiments, the server includes one or more independently executing servers, distributed servers, or a server cluster formed by a plurality of servers. The server may include a network communication unit, a processor, a memory, and the like. A distributed memory may include a plurality of processors, a plurality of network communication units, a plurality of memories, and the like. The plurality of memories may include a plurality of independent physical memories or a distributed memory system.

In some embodiments, the server includes an electronic device having computation and network interaction functionalities. In other embodiments, the server includes software that executes at the electronic device and provides service logic for data processing and network interactions.

In an exemplary scenario, the user conducts a human-machine conversation via an interface at a client. The content of the conversation relates to, for example, travel, shopping, movies, encyclopedic knowledge, jokes, or the like.

Figure 2:
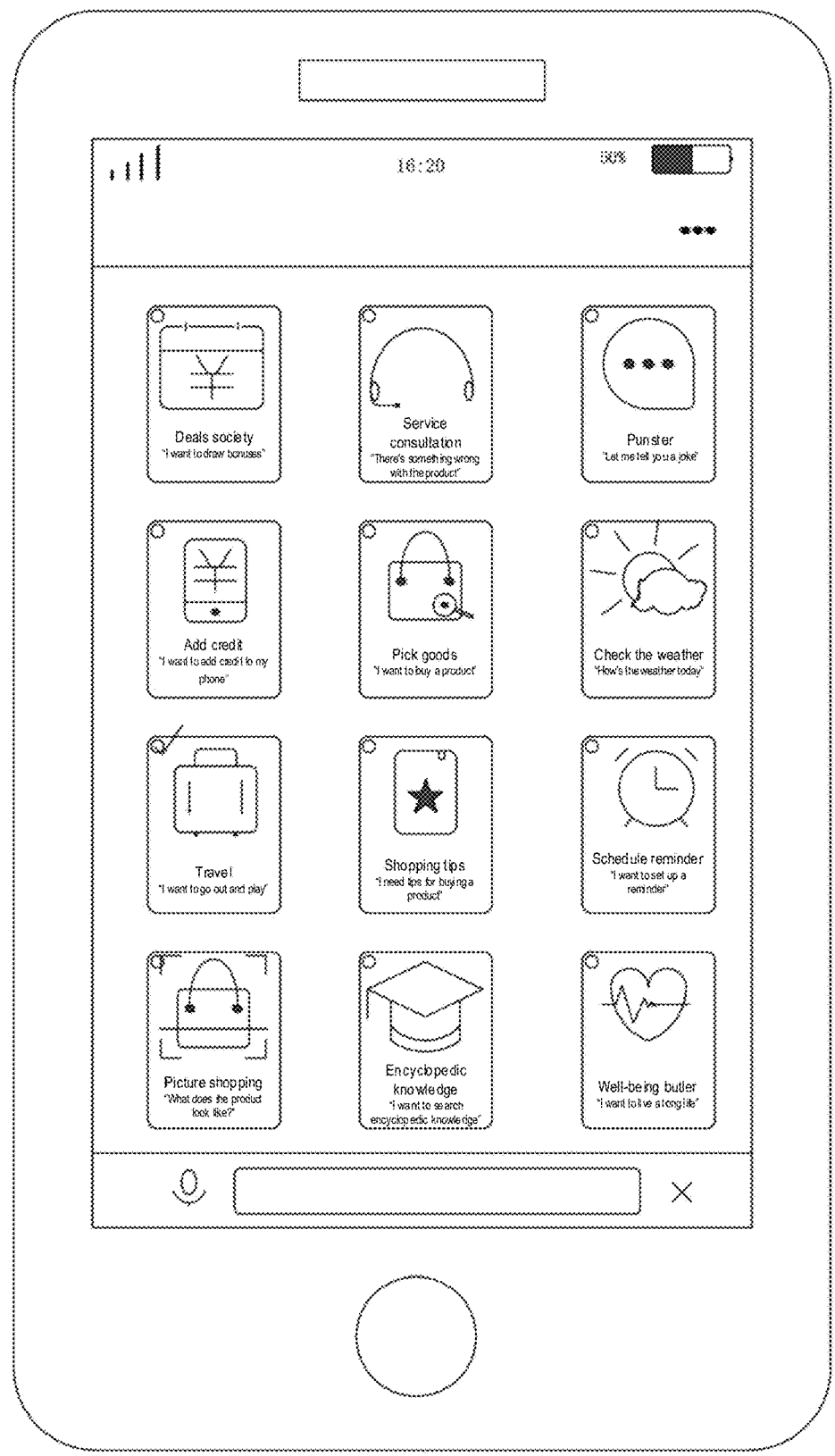
FIG. 2 is a diagram illustrating a user interface for human-machine conversations according to some embodiments of the disclosure.

FIG. 1 is a diagram illustrating a user interface for human-machine conversations, according to some embodiments of the disclosure. In some embodiments and as shown in FIG. 1, a user inputs "Search for air tickets to Beijing" on the human-machine conversation interface provided by a client. The client displays the information and sends the information to a server, which analyzes the information. During the process of the server analyzing the input information to obtain a system-specified service function corresponding to the input information, the client correspondingly displays a picture to indicate the progress of the process to the user. For example, in a dash-lined box a in the interface of FIG. 1, pictures associated with a plurality of function identifiers are sequentially displayed, showing a series of pictures from the one representing "Well-being butler," to the one representing "Travel," to the one representing "Shopping tips," to the one representing "Encyclopedic knowledge" (more details of which are illustrated in FIG. 2) until the analysis result is stopped. In one embodiment, the server analyzes the intent of the information to determine whether the intent of the information is related to the topic of well-being. As a result, the server obtains a value of confidence indicating that the intent of the information falls within the subject of "Well-being butler" is lower than 20%, which is below a preset threshold. That is, the information input by the user is less likely to be related to health topics. While the server is analyzing whether the information input by the user is related to the topic of well-being, the client displays the function identifier of "Well-being butler" at the interface. Then, the server analyzes the confidence that the intent of the information falls within the subject of "Travel," and the function identifier of "Well-being butler" displayed in the client changes to the function identifier of "Travel," and so on. When the probability that the information falls within a subject corresponding to a specific service function is higher than the preset value, the server concludes the analysis and executes the service function to respond to the information to obtain an output result, which is in transmitted to the client for display to the user.

In this exemplary scenario of FIG. 1, based on the above-described method, upon analysis, the server classifies the intent of the information "Search for air tickets to Beijing" as related to the subject of shopping. Based on its corresponding service function, the information is responded to, and the output information "Dear, do you want the order from Beijing to be expedited?" is obtained for answering the user and displayed on the human-machine conversation interface. As shown herein, in an affixing position to the displayed information, an icon b is further displayed to allow the user to modify the output result displayed at the client. When finding that the machine misunderstands the intent of the user, the user clicks on icon b. After the user clicks icon b, the client receives the operation of the user and responds by displaying, "Dear, did I get it wrong? Would you please correct it for me?" on the human-machine conversation interface, as well as further providing a function identifier list. A service indicated by each function identifier in the function identifier list is used to respond to the input information.

Figure 3:
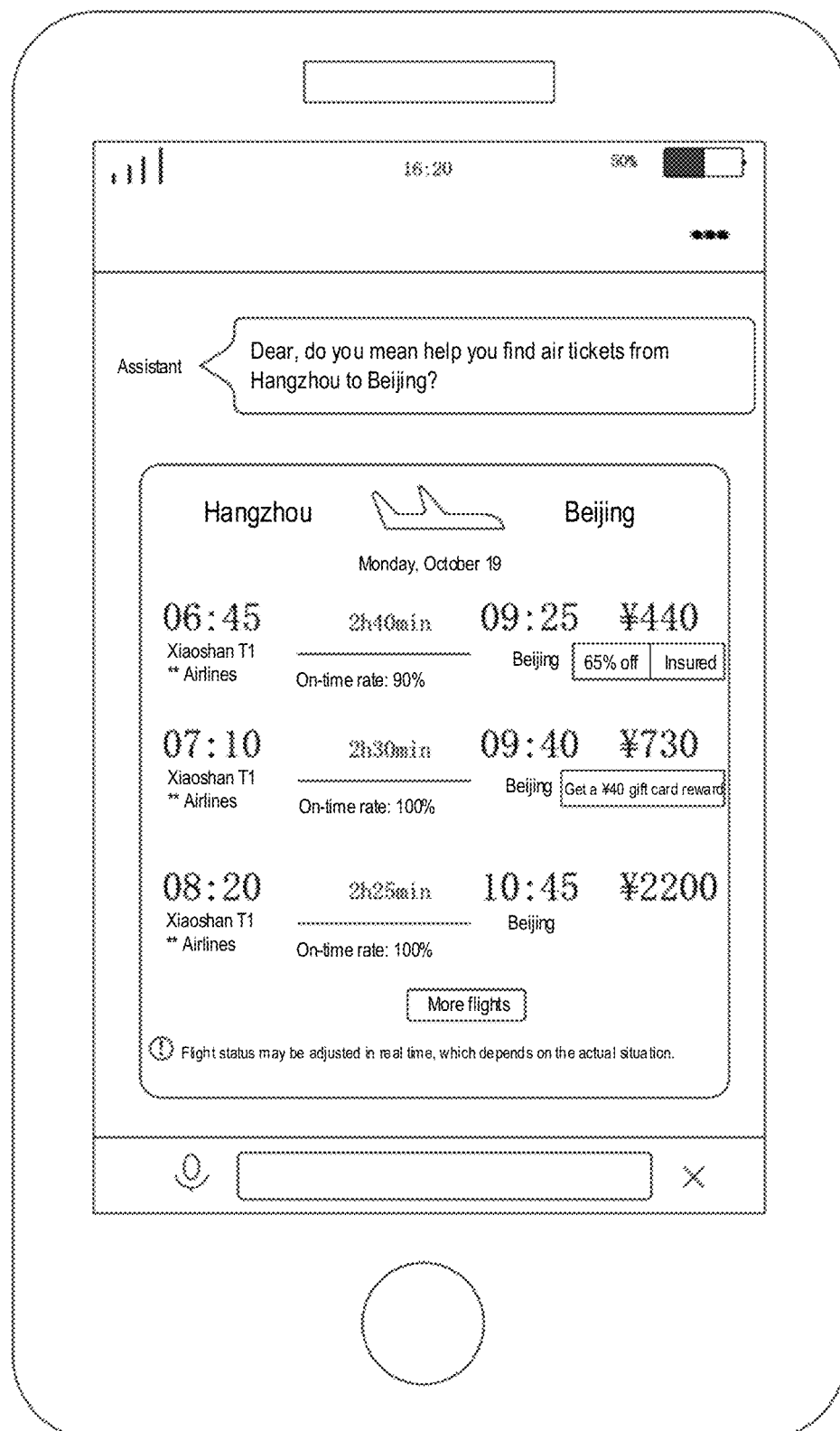
FIG. 3 is a diagram illustrating a user interface for human-machine conversations according to some embodiments of the disclosure.

As shown in FIG. 1, the user swipes through the interface with a finger to browse different function identifiers. The user clicks the picture of "Travel" in the function identifier list to select a function identifier corresponding to the function. The human-machine conversation interface is, in turn, configured to display the following message: "Dear, do you mean help you find air tickets from Hangzhou to Beijing?" A button d is further provided for confirmation, below the information. The user then determines whether the output result displayed by the human-machine conversation interface is correct. Referring to FIG. 3, if the user selects "Yes," the server acquires corresponding air ticket information from a third-party service provider and sends the air ticket information to the client, which displays the air ticket information for selection by the user at the client interface. Further, the server is configured to continuously learn to constantly improve conversations conducted by artificial intelligence based on options selected by the user.

In other exemplary scenarios, the user conducts a conversation on a human-machine conversation interface, involving content related to the topics of travel, shopping, movies, encyclopedic knowledge, jokes, or the like.

In this example, the user inputs "Search for air tickets to Beijing" on the human-machine conversation interface at the client. The server analyzes the information by analyzing the input information to obtain a system-specified service function corresponding to the input information. Since the time taken for analysis is short, the client hides the display of box a at the human-machine conversation interface of FIG. 1, no longer displaying it to the user.

Here, the server analyzes the input information to obtain a system-specified service corresponding to the input information, based on which the server responds to the input information. Moreover, an obtained output result is sent to the client such that the client displays an output result from executing the system service. When the user finds that the output result is not the information he/she wants, the user inputs the text of "That's not what I mean." In response, the human-machine conversation interface displays in full screen, as illustrated in FIG. 2, a list of function identifiers to make it convenient for the user to select a service function corresponding to a corresponding function identifier in the list to respond to the information "Search for air tickets to Beijing" input by the user.

Figure 4:
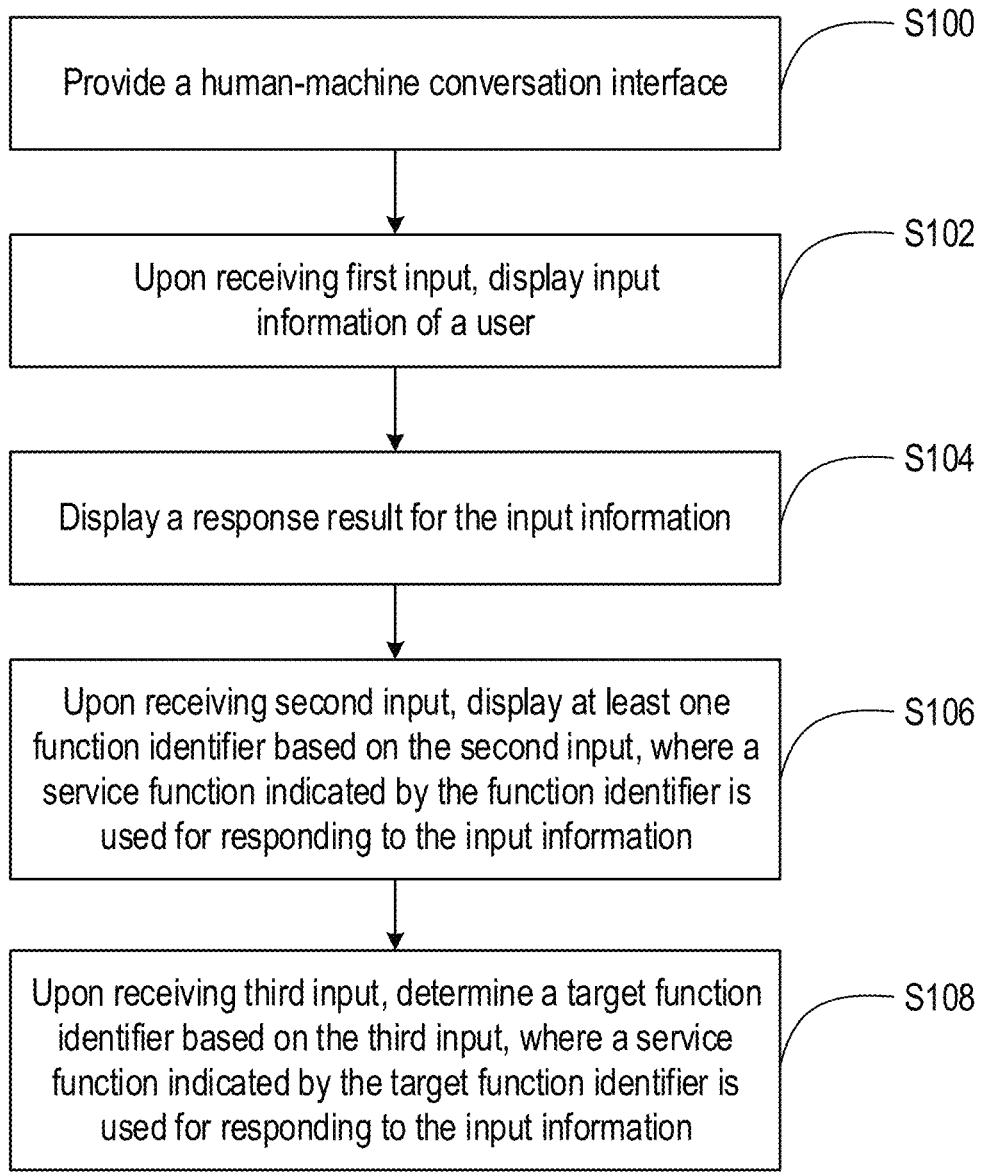
FIG. 4 is a flow diagram illustrating a method for providing human-machine conversations according to some embodiments of the disclosure.

FIG. 4 is a flow diagram illustrating a method for providing human-machine conversations according to some embodiments of the disclosure. In some embodiments, the method is applied to a client. In one embodiment and as shown herein FIG. 4, the method includes the following steps.

Step S100: provide a human-machine conversation interface.

In some embodiments, the human-machine conversation interface is an interface for human-machine information interaction. In one embodiment, the information displayed on the interface includes system information of the client, or information received from a server, or information input by a user at the client, or a result output by the client or the server in response to the information input by the user. For example, the user inputs "Tell a joke," and the client or the server, in response to the information, displays a joke on the interface. This way, information interaction is performed on the human-machine conversation interface between the user and the client (or the server), thereby implementing artificial intelligence assisted conversations. According to various embodiments, information displayed on the human-machine conversation interface includes information of, for example, text, pictures, animations, video, voice, and the like. In one example, a human-machine conversation includes a chat that builds a closer relationship. In another example, a conversation includes questions and answers for providing information. For instance, such questions include "what do you want to buy?" or "how much is this bag of instant noodles?" In other examples, a conversation has a specific intent. For example, when a user's intent is to buy instant noodles, a conversation is formed by a plurality of questions and answers regarding this intent.

In one embodiment, the user performs a preset operation to render the human-machine conversation interface popping up at the client. In some embodiments, the preset operation includes a user operation triggering a trigger condition so that the human-machine conversation interface is displayed (e.g., pops up) at the client. In some examples, the preset operation includes text input, voice input, or input of other actions. In some embodiments, the user inputs directly at the client or operates via an external device, such as a VR device, an electronic stylus, a keyboard, or a mouse, to input an operation. When the operation matches the preset operation, the trigger condition is satisfied so that the human-machine conversation interface pops up on the client. For example, when a sound attribute value is greater than a preset attribute value, the sound is recognized to match with a preset operation instruction. If there is a match, the human-machine conversation interface pops up. In another example, when the user clicks on a designated area of the client, the human-machine conversation interface pops up. For another example, when the user clicks on "Customer service bot," the human-machine conversation interface pops up on the client interface to conduct artificial intelligence assisted conversation.

Step S102: upon receiving a first or user input, the client displays input information of the user.

In some embodiments, the user input includes text input, voice input, or input of other actions. Correspondingly, the input information of the user includes text information, voice information, or the like, which is, in turn, displayed by the human-machine conversation interface to the user. The user enters the input directly at the client, or via an external device, such as a VR device, an electronic stylus, a keyboard, or a mouse. In one embodiment, in the case that the first input of the user is received, the first input generally refers to an input operation to be distinguished from the second input and third input described below.

Step S104: the client displays a response result for the input information.

In some embodiments, the response result includes feedback information obtained by the server or client processing the input information. As shown in the example of FIG. 1, after the user provides the input "Search for air tickets to Beijing," the client sends the information to the server, which processes and corresponds the information into a theme category of shopping service. Subsequently, the input information is processed via such service to obtain a response result "Dear, do you want the order from Beijing to be expedited?" For another example, when no corresponding service is found via matching, the response result includes the feedback information such as "Dear, I don't quite understand what you said."

Step S106: upon receiving second input, the client displays at least one feature identifier based on the second input, where a service function indicated by the function identifier is used for responding to the input information.

In some embodiments, the second input includes text input, voice input, or inputs of other actions. In one example, when the user finds that the output information returned by the machine does not correspond to his/her intent, the user enters text input of "That's not what I mean," or speak voice input, "That's not what I mean." In another example, the user clicks on the icon b in FIG. 1 to pop up the function identifier list for correction. Here, the operation of the user clicking on the icon b is regarded as the second input. When the second input of the user satisfies a preset trigger condition, at least one function identifier is displayed based on the second input.

In some embodiments, a service function indicated by the function identifier is used to respond to the input information. In some embodiments, the function identifier includes a picture, text, animation, or the like, to represent a corresponding service function. Displaying at least one function identifier includes displaying one or more function identifiers for selection by the user.

In some embodiments, displaying at least one function identifier includes displaying a list of function identifiers. Referring to the icon c of FIG. 1, the user swipes across the interface with a finger to browse different function identifiers. In other embodiments, displaying at least one function identifier includes displaying (e.g., popping up) a new interface window. As shown in FIG. 2, at least one function identifier is listed at the full-screen interface of FIG. 2. In some embodiments, the user performs an operation to switch between the above-described forms to display the two function identifier lists. For example, the user long-presses on the icon c in FIG. 1 such that the interface displays, in a full screen, the list of the function identifiers.

In some embodiments, responding to the input information includes analyzing the input information based on the service function indicated by the function identifier to obtain corresponding output information for display to the user. In one example, the service function indicated by the function identifier includes a service function related to a specific dimension or subject. To respond to the input information of the user, the input information is processed and analyzed based on the dimension or the subject to obtain corresponding output information. For example, the user sends a picture, and then clicks on the function identifier "Picture shopping." In this case, the picture is analyzed using the service function of picture shopping to obtain a corresponding list of products for selection by the user. When the user clicks on the function identifier "Encyclopedic knowledge," the picture is analyzed against the encyclopedic knowledge (e.g., obtain a similar picture or obtain a source or background of the picture).

In some embodiments, responding to the input information includes establishing a keyword library, which is utilized to match against utterances/sentences input by the user. In turn, a corresponding knowledge repository is used to obtain the output information. In various embodiments, responding to the input information includes the use of a search engine, text mining, natural language processing (NLP), or other technologies. For example, the most likely intent of the user is inferred based on the semantics of a piece of a short text (e.g., a question from the user), and then a result with the highest similarity is located from big data in the knowledge repository. In other embodiments, responding to the input information includes the use of deep data mining or big data technologies.

Step S108: upon receiving third input, determine a target function identifier based on the third input, where a service function indicated by the target function identifier is used for responding to the input information.

In some embodiments, a target function identifier is determined based on the third input. In some embodiments, the third input includes voice input, text input, an action operation, or the like, without limitations. The user selects, from the at least one displayed function identifier, one or more function identifiers as the target function identifiers with the third input. The server or the client uses a function identifier designated by the user input as the target function identifier. Several examples of selecting a function identifier using the user input are illustrated herein. Using the interface of FIG. 2 as an example, the user ticks at the upper left corner of the "Travel" function identifier to designate the function identifier, in a selected state, as the target function identifier. In examples, the user determines the target function identifier in other inputting manners. For instance, when the user gazes on a function identifier for a duration of time, the function identifier is selected as the target function identifier. Alternatively, or additionally, the user long-presses the identifier to designate it as the target function identifier. Embodiments of the disclosure are not limited to the above-described examples, and under the inspiration of the technical essence of the disclosure, those skilled in the art can also make other changes, which should all be included in the scope of the disclosure so long as the achieved functions and effects are identical or similar to those of the disclosure.

In some embodiments, a target function identifier is determined based on the third input, where a service function indicated by the target function identifier is used for responding to the input information. In some embodiments, after the target function identifier is determined based on the third input, the input information is responded to, based on a service function indicated by the target function identifier. In some embodiments, the service function is executed by the client to respond to the input information. The client responds to the input information from the user based on the service function corresponding to the target function identifier selected by the user. In other embodiments, the service function is executed by the server to respond to the input information may also be the server. The server responds to the input information of the user based on the service function corresponding to the target function identifier selected by the user to obtain the corresponding output information, which is fed back to the client such that the client, in turn, displays the output information to the user.

In some embodiments, the output information obtained in response to the input information includes text or voice information replying to the input information from the user. In other embodiments, the output information includes corresponding service content. In the example shown in the interface of FIG. 3, the input information of the user is "Search for air tickets to Beijing;" And the function identifier selected by the user is "Travel." The client or the server responds to, via the service function corresponding to the identifier, the information "Search for air tickets to Beijing" input by the user to obtain the output information "Dear, do you mean to help you find air tickets from Hangzhou to Beijing?" and including corresponding service content. The user selects a flight, and places an order to purchase the air ticket therefor. In other examples, the service content obtained by responding to the input information includes a link for selection by the user. Upon a click of the user, the client interface navigates to the corresponding page to meet the user's needs.

In some embodiments, data interaction between the client and the server includes sending and/or receiving data information via specific protocols. In some embodiments, transmission is via a protocol such as TCP/IP (Transmission Control Protocol/Internet Protocol) protocol, HyperText Transfer Protocol (HTTP), and the like. Using the above-described methods, data interaction between the client and the server is implemented so that the client provides the user with the human-machine conversation interface.

In some embodiments, a human-machine conversation interface is provided for the user to conduct a conversion with a machine via the interface. In one example, the content of the conversation includes chats for building a closer relationship. In another example, the conversation includes questions and answers for providing information. In other examples, the conversation includes a conversation themed with specific intents. When the machine is unable to identify the user's intent or identifies the intent erroneously, the user may select a corresponding function identifier to respond to his/her input information to improve the success rate of the machine identifying the user's intent thereby increasing the user's feeling of "You know me" and enhancing user experience.

In some embodiments, the step of displaying a response result for the input information includes the following steps.

Step S200: analyze the input information to obtain a system-specified service function corresponding to the input information.

In some embodiments, analyzing the input information to obtain a system-specified service function corresponding to the input information is performed by the client or the server.

In some embodiments, the system-specified service function refers to a service function, corresponding to the input information, determined by the client or the server after analyzing the input information. In one embodiment, for example, the user inputs "Search for air tickets to Beijing." The client or the server analyzes the semantics and intent of the information based on the input information to determine a corresponding service function. For instance, the probabilities of the information falling within the subjects such as "Well-being butler," "Travel," and "Encyclopedic knowledge" are respectively computed, and a service function corresponding to the subject incurring the highest probability is selected as the system-specified service function.

In one embodiment, analyzing the input information to obtain a system-specified service function corresponding to the input information includes analyzing and determining, based on the input information, which service function to be used to process the information. In some embodiments, the analyzing and determining the system-specified service function utilizes a recurrent neural network, a convolutional neural network, or the like. Embodiments herein may be configured such that the analyzing and determining the system-specified service function is implemented using any suitable artificial intelligence conversion technologies, without limitation.

In one embodiment, the analysis order of the process of analyzing the input information to obtain a system-specified service function corresponding to the input information is based on machine training results, such as, public behaviors, expert supervision, personalized training, crowd clustering training, context sequence training, or reinforced learning, to achieve an appropriate order.

Step S202: respond to the input information based on the system-specified service function.

Step S204: display an output result from executing the system-specified service function.

In some embodiments, the input information is responded to, and an output result of executing the system-specified service function is displayed. In some embodiments, the system-specified service function includes establishing a keyword library, against which keyword matching is performed on utterances/sentences input by the user. In turn, a corresponding repository is invoked to obtain the output information. In other embodiments, the input information is responded to, based on a search engine, text mining, natural language processing (NLP), or other technologies. For example, the most likely intent of the user is inferred based on the semantics of a piece of short text (e.g., a question from the user), and then a result having the highest similarity is found from massive content of the repository. In other examples, the input information is responded to based on deep mining, or a big data technologies.

In some embodiments, the output result includes a result responding to the input information. In one example, the user inputs "Tell a joke," and in response, the client or the server computes the probabilities of the information falling within the service functions. The probability represents a degree that the intent corresponding to the input information of the user matches the service functions. If the client or the server determines that the probability of the information falling within the service function "Punster" is high, the input information is analyzed based on the service function "Punster." As a result, one of the jokes is selected from a joke content pool for displaying to the user.

In some embodiments, displaying an output result from executing the system-specified service function is includes the client executing the system service function to obtain an output result; and displaying the output result on the human-machine conversation interface. In other embodiments, the server executes the system service function to obtain an output result and send the output result to the client, which, in turn, displays the output result on the human-machine conversation interface.

In the above-described embodiments, the client or the server, based on input information of the user, processes and analyzes to obtain an output result, thereby enhancing the fluidity of conversations, and saving users from unwanted operations.

In some embodiments, the process of analyzing the input information to obtain a system-specified service function corresponding to the input information further includes the step of displaying at least one function identifier corresponding to a service function.

In one embodiment, the displaying at least one function identifier corresponding to the service function indicates the process of analyzing the input information to obtain a system-specified service function corresponding to the input information such that the user perceives, from the interface, the progressing state of determining the system-specified service function.

In one embodiment, the displaying at least one function identifier corresponding to the service function displays, in a sequence, the at least one function identifier corresponding to the service function. In the example illustrated in FIG. 1, the user inputs a sentence of "Search for air tickets to Beijing." The client or the server analyzes the sentence and which service function to be used to respond to the input information, during the process of which content is displayed at box a. For example, the client or the server first analyzes the probability of the information input by the user falls within the service function "Well-being butler," and then analyzes the probability of falling within the service function "Travel." Accordingly, the content displayed at box a on the human-machine conversation interface changes from the function identifier corresponding to the service function "Well-being butler" (e.g., displayed first) to the function identifier corresponding to the service function "Travel" (e.g., displayed second). In some embodiments, the displayed function identifier has no correspondence with the function identifier involved in the process of analyzing the input information to obtain a system-specified service function corresponding to the input information, only used for displaying to and informing the user that the client or the server is analyzing and determining the system-specified service function.

In some embodiments, the at least one displayed function identifier corresponding to the service function includes an animation, text information, or sound information to indicate the course of analyzing the input information to obtain a system-specified service function corresponding to the input information.

In some embodiments, as the analysis process ends, the at least one displayed function identifier corresponding to service functions is hidden, or a picture corresponding to the end of the analysis process is displayed. In other embodiments, after the process of analyzing the input information to obtain a system-specified service function corresponding to the input information ends, text information of "Analysis ends" is displayed to inform the user that the process ends.

In some embodiments, the at least one function identifier corresponding to the service function is displayed unconditionally. In other embodiments, such at least one function identifier is displayed only when a visual operation time is less than the time used for analysis. For example, when the client or the server analyzes the probability of the information input by the user falling within the service function "Well-being butler," the client responds to the analysis process and displays the function identifier corresponding to the service function "Well-being butler." The time spent by the client responding to the analysis process to display the corresponding function identifier is referred herein as the visual operation time.

As illustrated in the above-described embodiments, at least one function identifier corresponding to a service function is displayed to the user to indicate that the client or the server is analyzing the input information to determine a system-specified service function corresponding to the input information, thereby realizing more intuitive displays for the user, enriching human-machine conversations, and improving user experience.

In some embodiments, the function identifier of the step of displaying at least one function identifier corresponding to a service function is the function identifier corresponding to a service function involved in the process of analyzing the input information to obtain a system-specified service function corresponding to the input information.

In some embodiments, the at least one displayed function identifier corresponding to the service function is an animation formed by displaying pictures in turn. In one example, referring again to box a of FIG. 1, the identifier displayed in the analysis animation changes, in turn, from the function identifier of "Well-being butler" to the function identifier of "Travel," representing the service function involved in the process of determining the service function.

As illustrated in the above-described embodiments, at least one function identifier corresponding to a service function is displayed to the user. Such function identifiers involved are related to the service functions involved in the process of analyzing the input information to obtain a system-specified service function corresponding to the input information. This way, the process of determining the service function is more intuitively reflected by displaying pictures in turn, which helps the user to know what the machine is doing, thereby improving interactivity.

In some embodiments, when receiving second input, in the step of displaying at least one function identifier based on the second input the second input includes at least one of the following: text information input by the user; or voice information input by the user; or an operation received from the user via the human-machine conversation interface.

Figure 5:
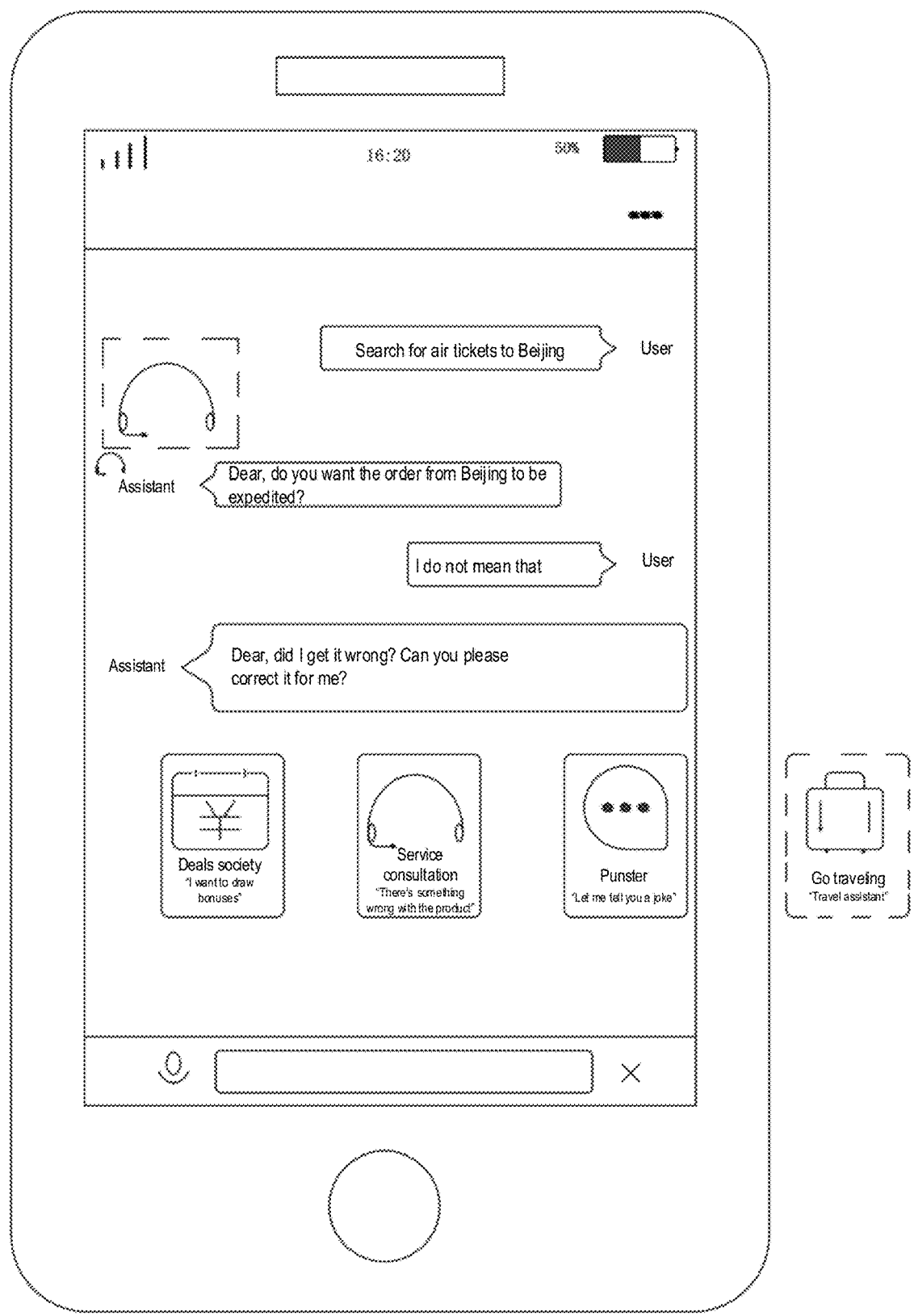
FIG. 5 is a diagram illustrating a user interface for human-machine conversations according to some embodiments of the disclosure.

FIG. 5 is a diagram illustrating a user interface for human-machine conversations according to some embodiments of the disclosure. In some embodiments, the above-described second input includes at least one of the following: text information input by the user; or voice information input by the user; or an operation of the user received via the human-machine conversation interface. In one example, the text information is "That's incorrect," "You misunderstood me," or the like, input by the user. In another example, the voice information is vocal utterance of "That's not what I mean," "You misunderstood me," or the like, recorded by the user via a voice input device. In other examples, the operation of the user at the human-machine conversation interface is an operation of the user clicking on a specific area in the human-machine conversation interface, an operation of the user shaking the client, or the like.

According to the above-described embodiments, the second input is provided in a variety of manners such that, upon receiving the second input, the client displays at least one function identifier based on the second input.

In some embodiments, upon receiving a second, displaying at least one function identifier based on the second input includes the following steps: in the case that the text information of the second input includes a specified phrase, displaying a function identifier designated by the specified phrase; or in the case that the voice information of the second input includes a specified sound, displaying a function identifier designated by the specified sound; or in the case that the second input includes a specified operation of the user at the human-machine conversation interface, displaying a function identifier designated by the specified operation.

In one embodiment, at least one function identifier is displayed when the second input meets a specified trigger condition to correct the output result originally obtained by the client or the server from analyzing the input information of the user. In one example, the specified phrase includes "Incorrect," "What you said is irrelevant," or the like. When the text information of the second input includes the afore-described specified phrase, the trigger condition is satisfied, and at least one function identifier is displayed. In another example, the specified sound includes vocal utterance of "Incorrect," "What you said is irrelevant," or the like. When the voice information of the second input includes the afore-described specified sound, the trigger condition is satisfied, and at least one function identifier is displayed. In yet another example, the specified operation includes that the user clicks on area b of the user interface in FIG. 1, or long-presses the output result displayed on the human-machine conversation interface. When the second input is the specified operation, the trigger condition is satisfied such that the interface displays at least one function identifier for correcting the output result.

According to the above-described embodiments, a plurality of trigger conditions for displaying at least one function identifier is provided. When the second input of the user satisfies one or a plurality of trigger conditions, the client displays at least one function identifier for selection by the user.

In some embodiments, the function identifier is pictorial or textual information describing the service function, or a combination of both.

In some embodiments, the function identifier includes a picture, text, or a combination of both. Referring to the example illustrated in FIG. 1, the function identifier "Deals society" indicates the input information of the user is analyzed from the dimension or subject of deals. As shown in FIG. 1, the function identifier is a picture. In other examples, the function identifier is the text "Deals society," or a combination of both. In some implementations, the function identifier further includes corresponding textual information for explaining the service function corresponding to the function identifier.

According to the above-described embodiments, representations of a function identifier is provided and displayed to the user such that it is convenient for the user to understand the service function corresponding to an identifier.

In one embodiment, textual information for describing the service function corresponding to the function identifier is displayed underneath the function identifier.

In one example, the textual information includes text describing the service function corresponding to the function identifier. In the example illustrated in FIG. 2, the captions "What does the product look like?", "I want to search for encyclopedic knowledge" and "I want to live a long life" are respectively displayed underneath the function identifier "Picture shopping," the function identifier "Encyclopedic knowledge," and the function identifier "Well-being butler," describing the corresponding service functions.

In some embodiments, textual information for describing the service function corresponding to the function identifier is displayed underneath the function identifier such that it is convenient for the user to understand the service function represented by the function identifier.

In some embodiments, determining a target function identifier is based on the third input further includes the following steps.

Step S300: receive the textual information input by the user.

Step S302: activate a corresponding service function based on the textual information to respond to the input information of the user.

Figure 6:
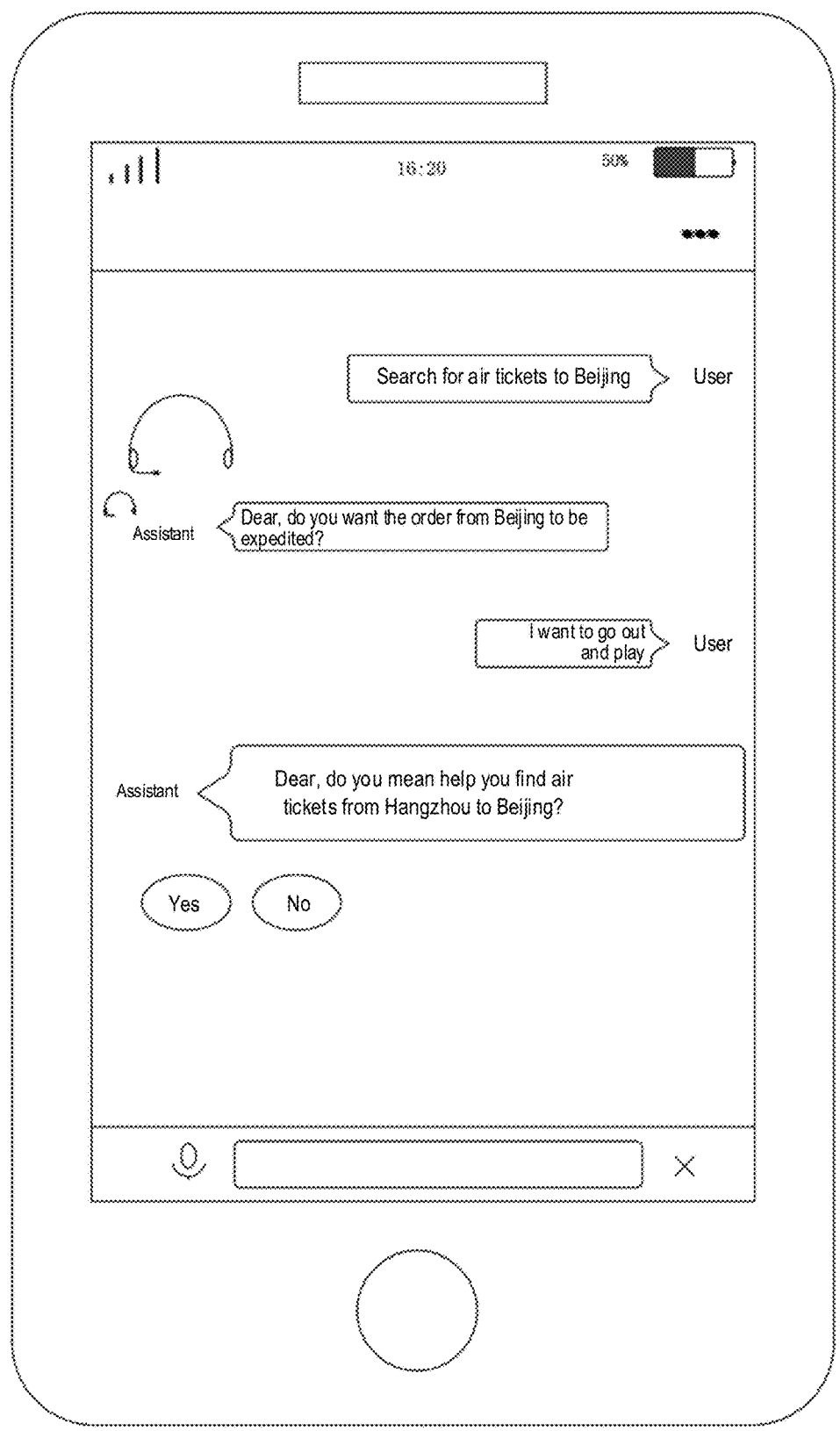
FIG. 6 is a diagram illustrating a user interface for human-machine conversations according to some embodiments of the disclosure.

FIG. 6 is a diagram illustrating a user interface for human machine conservations according to some embodiments of the disclosure. In some embodiments, the user further inputs the textual information for triggering a corresponding service function to respond to the input information of the user. In one example, the user inputs "Search for air tickets to Beijing," but receives the feedback information as "The order from Beijing needs to be expedited." The user decides that the information is wrong and not what he/she wants. The user inputs textual information "I want to go out and play" corresponding to the service function "Travel." Based on the received textual information "I want to go out and play," the machine executes the service function (e.g., travel service) to respond to the input information "Search for air tickets to Beijing" of the user.

According to the above-described embodiments, a method for determining the target function identifier is provided. The user inputs textual information of a function identifier he/she wants to select the function identifier. This way, the server or the client uses the function identifier selected by the user as the target function identifier to respond to the input information of the user.

In some embodiments, displaying at least one function identifier includes displaying at least two function identifiers, different function identifiers corresponding to different service functions.

In some embodiments, different service functions respond to the input information of the user from the perspectives of different dimensions. As such, function identifiers corresponding to at least two service functions are provided for selection by the user. For example, two, three, or more function identifiers are displayed to increase the probability of matching the user's intention.

In one embodiment, in determining a target function identifier based on the third input, a plurality of target function identifiers exist. Accordingly, in responding to the input information based on a service function indicated by the target function identifier, the input information is responded to, in turn, based on service functions indicated by the plurality of target function identifiers.

In some embodiments, the third input is the clicking on a corresponding function identifier, or the user gazing on a function identifier he/she wants to select for a specified period of time, or inputting specified text information or voice information to select a corresponding function identifier, which is used as the target function identifier.

In some embodiments, the user selects a plurality of function identifiers to serve as the target function identifiers. In the case that the user selects a plurality of target function identifiers, the client or the server obtains a plurality of corresponding output results for displaying to the user, when responding to the input information based on service functions indicated by the target function identifiers, in turn.

According to the above-described embodiments, a plurality of target function identifiers are determined. This way, corresponding service functions, in turn, respond to the input information to provide a plurality of output results to the user, thereby increasing the probability of matching the user's intent.

Figure 7:
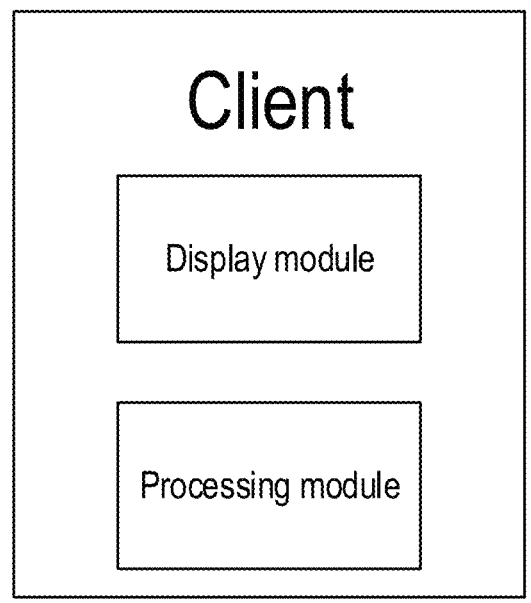
FIG. 7 is a block diagram illustrating a client device according to some embodiments of the disclosure.

FIG. 7 is a block diagram illustrating a client according to some embodiments of the disclosure. In some embodiments, and as shown herein, a client includes a display module and a processing module.

The display module is configured to provide a human-machine conversation interface. Upon receiving first input, the display module is configured to display input information of a user; and display a response result for the input information. Upon receiving second input, the display module is configured to display at least one function identifier based on the second input, a service function indicated by the function identifier being used for responding to the input information.

The processing module is configured to, upon receiving third input, determine a target function identifier based on the third input, a service function indicated by the target function identifier being used for responding to the input information.

In some embodiments, details regarding the client substantially similar to above-described embodiments are not repeated herein.

Figure 8:
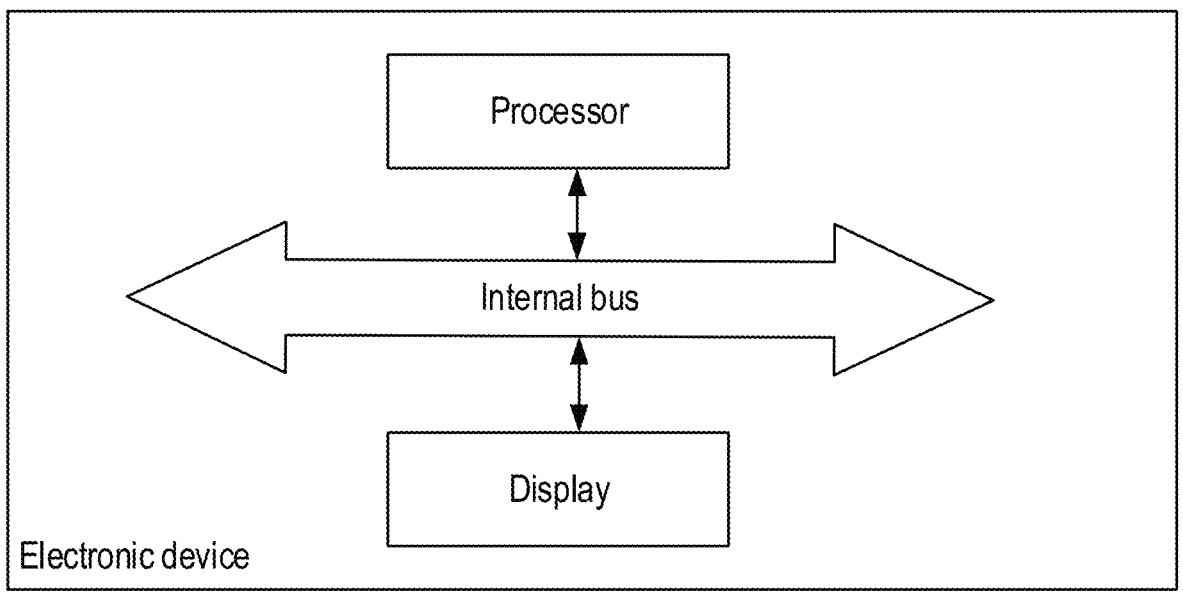
FIG. 8 is a block diagram illustrating an electronic device according to some embodiments of the disclosure.

FIG. 8 is a block diagram illustrating an electronic device according to some embodiments of the disclosure. In some embodiments and as shown herein, an electronic device includes a display and a processor.

The display is configured to provide a human-machine conversation interface. Upon receiving first input, the display is configured to display input information of a user; and a response result for the input information. Upon receiving a second input, the display is configured to display at least one function identifier based on the second input, a service function indicated by the function identifier being used for responding to the input information.

The processor is configured to upon receiving third input, determine a target function identifier based on the third input, a service function indicated by the target function identifier being used for responding to the input information.

In some embodiments, the display is an interface for displaying a client. In some examples, the display is a computer display or a mobile phone screen. In other examples, the display is an input/output device, which is a display tool that displays electronic file data on a screen via a specific transmission device, and then reflects the electronic file data to human eyes.

In some embodiments, the processor is implemented in any appropriate manner, without limitation. For example, the processor may be implemented in the form of a microprocessor or processor and a computer-readable medium that stores computer-readable program code (e.g., software or firmware) executable by the (micro)processor, a logic gate, a switch, an application specific integrated circuit (ASIC), a programmable logic controller, and an embedded microcontroller.

Only the difference from the above-described embodiments is described. Details substantially similar are not repeated herein.

Some embodiments of the disclosure further provide a computer storage medium configured to store computer program instructions for performing the steps of: providing a human-machine conversation interface; upon receiving first input, displaying input information of a user; displaying a response result for the input information; upon receiving second input, displaying at least one function identifier based on the second input, wherein a service function indicated by the function identifier is used for responding to the input information; and upon receiving third input, determining a target function identifier based on the third input, wherein a service function indicated by the target function identifier is used for responding to the input information.

In some embodiments, the computer storage medium includes, but is not limited to, a random access memory (RAM), a read-only memory (ROM), a cache, a hard disk drive (HDD), or a memory card.

Details of the functions and effects achieved by executing the program instructions stored on the computer storage medium that are substantially similar to the above-described embodiments are not repeated herein.

Figure 9:
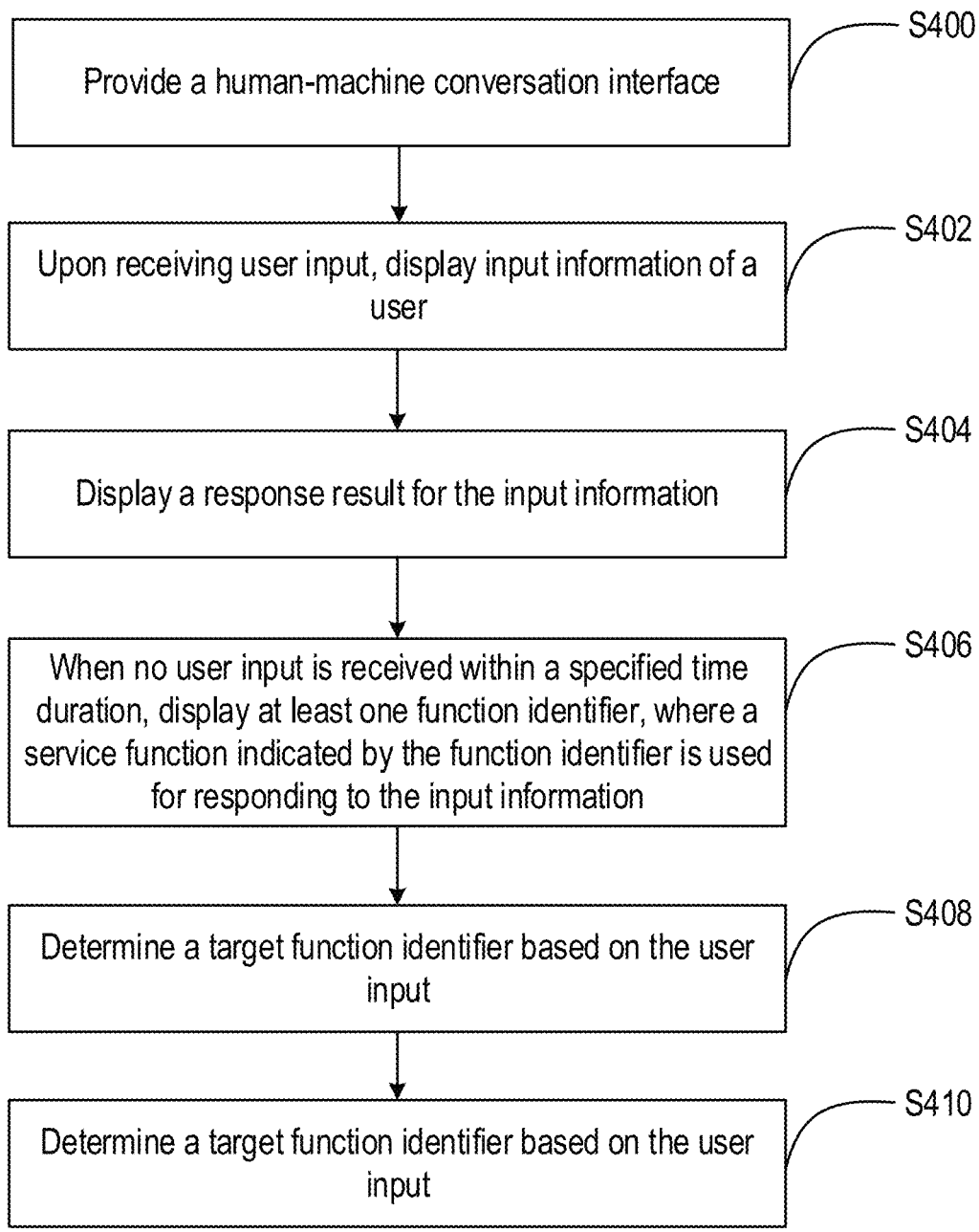
FIG. 9 is a flow diagram illustrating a method for providing human-machine conversations according to some embodiments of the disclosure.

FIG. 9 is a flow diagram illustrating a method for providing human-machine conversations according to some embodiments of the disclosure. In some embodiments, the method is applied to a client. In one embodiment and as shown herein FIG. 9, The method includes the following steps.

Step S400: provide a human-machine conversation interface.

Step S402: upon receiving user input, display input information of a user.

Step S404: display a response result for the input information.

Step S406: when no user input is received within a specified time duration, display at least one function identifier, a service function indicated by the function identifier being used for responding to the input information.

Step S408: determine a target function identifier based on the user input.

Step S410: respond to the input information based on a service function indicated by the target function identifier.

In some embodiments, the case where no user input is received within a specified time duration refers to the case that the client has not received text information, voice information, or an operation input by the user within a specified time duration. In some embodiments, the specified time duration is a duration preset by the client. For example, the specified duration is preset as 30 seconds, 60 seconds, or the like. In one example, after the user inputs "Search for air tickets to Beijing," the client sends the information to the server, and the server performs processing and matches the information with a service function of a subject of shopping. The input information is processed via the service function to obtain a response result "Dear, do you want the order from Beijing to be expedited?". After the client displays the response result, the client does not receive any input from the user within the specified duration of 30 seconds. When the specified time duration expires, the client displays at least one function identifier for selection by the user to correct the original response result.

The above-described embodiment provides a human-machine conversation method. In this embodiment, after a response result for the input information is displayed, if no user input is received within a specified time duration, at least one function identifier is displayed for selection by the user.

Only the difference from the above-described embodiments is described. Details substantially similar to other embodiments described herein are not repeated.

In one embodiment, the disclosure provides a client. The client includes a display module and a processing module.

The display module is configured to provide a human-machine conversation interface; upon receiving user input, display input information of a user; display a response result for the input information; and when no user input is received within a specified time duration, display at least one function identifier, where a service function indicated by the function identifier is used for responding to the input information.

The processing module is configured to determine a target function identifier based on the user input and respond to the input information based on a service function indicated by the target function identifier.

Only the difference from the above-described embodiment is described. Details substantially similar to other embodiments described herein are not repeated.

In one embodiment, the disclosure provides an electronic device. The device includes a display and a processor.

The display is configured to provide a human-machine conversation interface; upon receiving user input, display input information of a user; display a response result for the input information; and when no user input is received within a specified time duration, display at least one function identifier, where a service function indicated by the function identifier is used for responding to the input information.

The processor is configured to determine a target function identifier based on the user input and respond to the input information based on a service function indicated by the target function identifier.

Only the difference from the above-described embodiment is described. Details substantially similar to other embodiments described herein are not repeated.

An embodiment of the disclosure further provides a computer storage medium for configured to store computer program instructions for performing the following: providing a human-machine conversation interface; upon receiving user input, displaying input information of a user; displaying a response result for the input information; when no user input is received within a specified time duration, displaying at least one function identifier, wherein a service function indicated by the function identifier is used for responding to the input information; determining a target function identifier based on the user input; and responding to the input information based on a service function indicated by the target function identifier.

Figure 10:
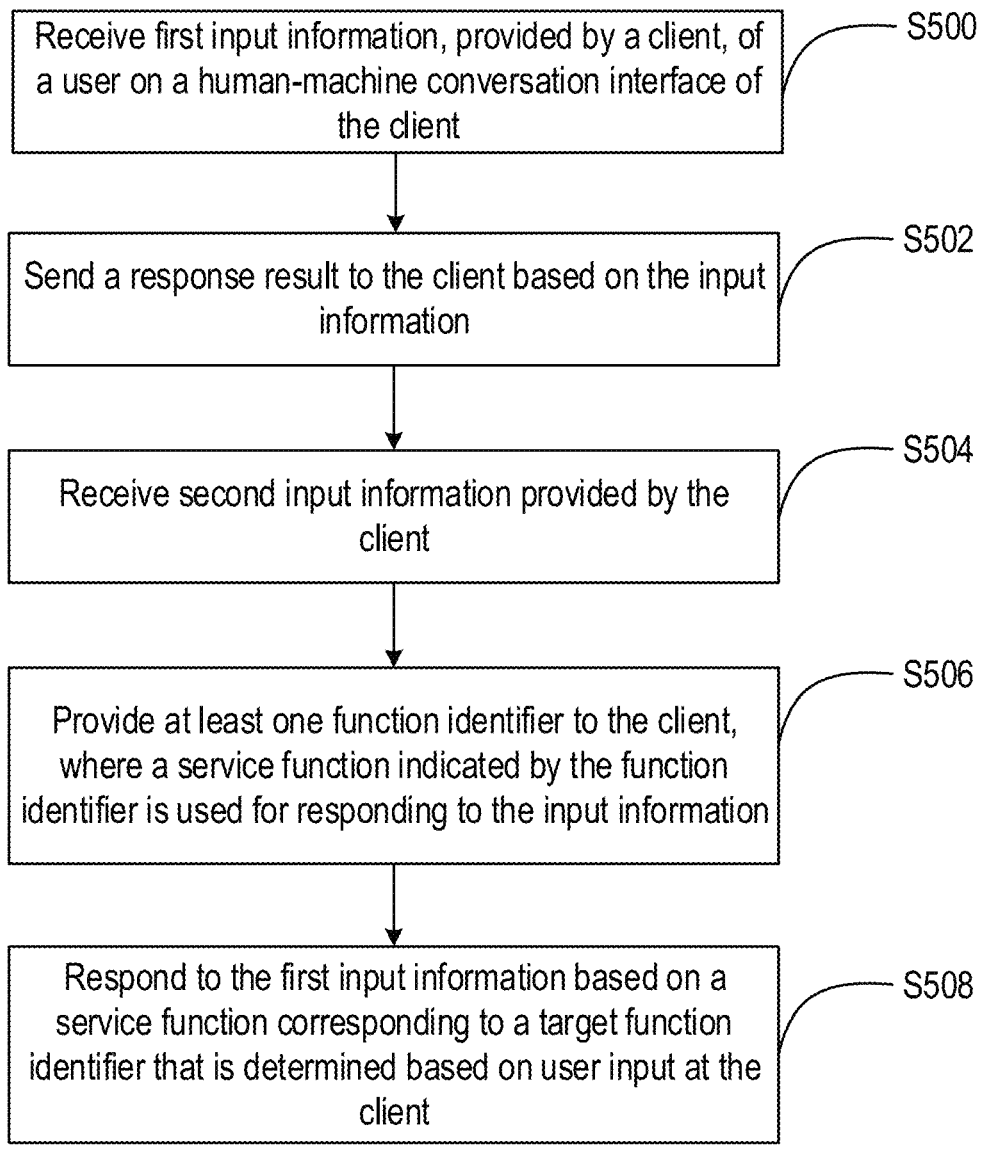
FIG. 10 is a flow diagram illustrating a method for providing human-machine conversations according to some embodiments of the disclosure.

Only the difference from the above-described embodiment is described. Details substantially similar to other embodiments described herein are not repeated. FIG. 10 is a flow diagram illustrating a method for providing human-machine conversations according to some embodiments of the disclosure. In some embodiments, the method is applied at a server. In one embodiment, and as shown herein FIG. 10, the method includes the following steps.

Step S500: receive first input information provided by a client of a user on a human-machine conversation interface of the client.

Step S502: send a response result to the client based on the input information.

Step S504: receive second input information provided by the client.

Step S506: provide at least one function identifier to the client, where a service function indicated by the function identifier is used for responding to the input information.

Step S508: respond to the first input information based on a service function corresponding to a target function identifier determined based on user input at the client.

In some embodiments, the first input information of the user on the human-machine conversation interface of the client includes text information, voice information, or the like. In one example, the user inputs text information "Search for air tickets to Beijing" on the client interface. The client sends the first input information of the user to the server such that the server performs analysis based on the first input information to obtain a response result, and sends the response result to the client.

In some embodiments, second input information provided by the client is received. In some implementations, the second input information includes a signal, or the like, representing the intent of the user to correct the response result, based on which the server is triggered to provide at least one function identifier to the client. In one embodiment, a service function is determined based on the target function identifier determined based on the user input at the client.

In some embodiments, a human-machine conversation method is provided on the server, details of which are substantially similar to above-described embodiments are not repeated herein.

In some embodiments, the step of sending the response result to the client includes the following steps.

Step S600: analyze the first input information to obtain a system-specified service function corresponding to the first input information.

Step S602: respond to the first input information based on the system-specified service function to obtain an output result of executing the system-specified service function.

In some embodiments, the system-specified service function includes a service function corresponding to the input information and determined by the server after analyzing the input information. In one example, the user inputs "Search for air tickets to Beijing." The client or the server analyzes the semantics and intent of the information based on the information to determine a corresponding service function. For example, the probabilities of the information falling within the subjects such as "Well-being butler," "Travel," and "Encyclopedic knowledge" are respectively computed, and a service function corresponding to the subject incurring the highest probability is selected as the system-specified service function.

In some embodiments, analyzing the input information to obtain a system-specified service function corresponding to the input information includes analyzing and determining, based on the input information, which service function to be used to process the information. In some embodiments, analyzing and determining the system-specified service function is implemented using a recurrent neural network, a convolutional neural network, or the like. Other artificial intelligence conversion technologies can be applied to analyzing and determining the system-specified service function without limitation.

In some embodiments, the analysis order involved in the process of analyzing the input information to obtain a system-specified service function corresponding to the input information is based on a machine training result, such as, public behaviors, expert supervision, personalized training, crowd clustering training, context sequence training, or reinforced learning, to achieve an appropriate order.

In one embodiment, in the step of activating a corresponding service function based on a target function identifier that is determined based on user input at the client, a plurality of target function identifiers exist. Accordingly, the server responds to the input information based on service functions indicated by the plurality of target function identifiers, in turn.

In some embodiments, the user selects a plurality of function identifiers to serve as the target function identifiers.

When the user selects a plurality of target function identifiers, the server obtains a plurality of corresponding output results when responding to the input information, in turn, based on service functions indicated by the target function identifiers, and sends the output results to the client for displaying to the user by the client.

According to the above-described embodiments, a plurality of target function identifiers are determined such that corresponding service functions respond to the input information, in turn, to provide a plurality of output results to the user, thereby increasing the probability of matching the user's intent.

An embodiment of the disclosure further provides an electronic device. The electronic device includes a network communication unit and a processor.

The network communication unit is configured to receive first input information, provided by a client, of a user on a human-machine conversation interface of the client; send a response result to the client based on the input information; and receive second input information provided by the client.

The processor is configured to provide at least one function identifier to the client, where a service function indicated by the function identifier is used for responding to the input information; and activate a corresponding service function based on a target function identifier that is determined based on user input at the client.

Only the difference from the above-described embodiment is described. Details substantially similar to other embodiments described herein are not repeated. An embodiment of the disclosure further provides a computer storage medium configured to store computer program instructions for performing the following: receiving first input information, provided by a client, of a user on a human-machine conversation interface of the client; sending a response result to the client based on the input information; receiving second input information provided by the client; providing at least one function identifier to the client, wherein a service function indicated by the function identifier is used for responding to the input information; and activating a corresponding service function based on a target function identifier that is determined based on user input of the client.

Only the difference from the above-described embodiment is described. Details substantially similar to other embodiments described herein are not repeated. The embodiments in the disclosure are described in a progressive manner, and for identical or similar parts between different embodiments, reference may be made to each other so that each of the embodiments focuses on differences from other embodiments.

The server mentioned in the embodiments of the disclosure may be an electronic device having certain computing and processing capabilities. The server may have a network communication unit, a processor, a memory, and the like. Certainly, the aforementioned server may also refer to software running in the electronic device. The aforementioned server may also be a distributed server, which may be a system having a plurality of processors, memories, and network communication modules that operate collaboratively.

In the 1990$s$, whether a technical improvement is a hardware improvement (for example, an improvement on a circuit structure such as a diode, a transistor, or a switch) or a software improvement (an improvement on a method procedure) can be clearly differentiated. However, along with the development of technologies, many improvements on method procedures at present can be regarded as direct improvements on hardware circuit structures. Almost all the designers program an improved method procedure into a hardware circuit to obtain a corresponding hardware circuit structure. Therefore, it cannot be said that an improvement on a method procedure cannot be implemented by a hardware entity module. For example, a programmable logic device (PLD) (for example, a field programmable gate array (FPGA)) is such an integrated circuit whose logic function is determined by device programming of a user. The designers may program by themselves to "integrate" a digital system with a PLD, and there is no need to ask a chip manufacturer to design and manufacture an application specific integrated circuit chip. Furthermore, instead of manually manufacturing an integrated circuit chip, such programming is often implemented by "logic compiler" software, which is similar to a software compiler used in program development and writing, and before compiling, original code may also be written in a particular programming language, which is referred to as a hardware description language (HDL). There is not only one type of HDL but also a plurality of types of HDLs, for example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog2 are most commonly used nowadays. Those skilled in the art should also understand that a hardware circuit for implementing a logic method procedure may be easily obtained only by slightly logically programming the method procedure using the above several hardware description languages and programming the method procedure into an integrated circuit.

Those skilled in the art also know that, in addition to implementing the client and the server by pure computer-readable program code, logic programming can be performed on method steps to allow the client and the server to implement the same function in the form of a logic gate, a switch, an application specific integrated circuit, a programmable logic controller, an embedded microcontroller, or the like. Therefore, such a client or server may be regarded as a hardware component, and an apparatus for implementing various functions included in the client or server may be regarded as a structure in the hardware component. Or, the apparatus for implementing various functions can even be regarded as both a software module for implementing a method and a structure in a hardware component.

Through the above description of the embodiments, those skilled in the art can clearly understand that the disclosure can be implemented by means of software plus a necessary universal hardware platform. Based on such an understanding, the essence of the technical solution of the disclosure or the part that contributes to the prior art may be embodied in the form of a software product. The computer software product may be stored in a storage medium such as a ROM/RAM, a magnetic disk, or an optical disc, and include instructions to instruct a computer device (which may be a personal computer, a server, a network device, or the like) to perform the methods described in the embodiments of the disclosure or in some parts of the embodiments.

The embodiments in the disclosure are described in a progressive manner, and for identical or similar parts between different embodiments, reference may be made to each other so that each of the embodiments focuses on differences from other embodiments. In particular, the embodiments of the server, the user client, and the computer storage medium can all be explained with reference to the aforementioned embodiments of the methods.

The disclosure may be described in a general context of computer-executable instructions executed by a computer, such as a program module. Generally, the program module includes routines, programs, objects, components, data structures, and so on, for executing particular tasks or implementing particular abstract data types. The disclosure may also be implemented in distributed computing environments. In the distributed computing environments, tasks are executed by remote processing devices that are connected by a communication network. In a distributed computing environment, the program module may be located in local and remote computer storage media including storage devices.

Although the disclosure is described through the embodiments, those of ordinary skill in the art know that the disclosure has many modifications and variations without departing from the spirit of the disclosure. It is intended that the appended claims include these modifications and variations without departing from the spirit of the disclosure.

What is claimed is:

1. A method comprising:
receiving, by a processor, user input information via a human-machine conversation interface;
displaying, by the processor, a response result, the response result generated based on the user input information and including a candidate function identifier for responding to the user input information, the candidate function identifier selected by the processor from one or more function identifiers;
receiving, by the processor, a second user input provided in response to the response result;
displaying, by the processor, a subset of the one or more function identifiers in response to the second user input, each of a subject of the one or more function identifiers associated with a service function for performing a respective action by a computing device, the service function determined based on the user input information and configured to respond to the user input information; and
determining, by the processor, a target function identifier based on a third user input, the target function identifier indicating a service function for responding to the user input information.

2. The method of claim 1, the displaying a response result comprising:
analyzing the user input information to obtain a system-specified service function corresponding to the user input information;
responding to the user input information based on the system-specified service function; and
displaying an output result generated by executing the system-specified service function.

3. The method of claim 2, the analyzing the user input information to obtain a system-specified service function comprising displaying at least one function identifier corresponding to a service function.

4. The method of claim 3, the function identifier corresponding to a service function for analyzing the user input information to obtain the system-specified service function corresponding to the user input information.

5. The method of claim 1, the second user input comprising information selected from the group consisting of:
text information input;
voice information input; and
an operation of a user received at the human-machine conversation interface.

6. The method of claim 5, the displaying the function identifier in response to the second user input comprising:
   if the text information of the second user input comprises a specified phrase, displaying a function identifier designated by the specified phrase;
   if the voice information of the second user input comprises a specified sound, displaying a function identifier designated by the specified sound; and
   if the second user input comprises a specified operation of the user on the human-machine conversation interface, displaying a function identifier designated by the specified operation.

7. The method of claim 1, the function identifier comprising textual information describing the service function corresponding to the function identifier, the textual information displayed near the function identifier.

8. The method of claim 7, the determining a target function identifier based on the third user input comprising:
   receiving textual information input by a user; and
   activating a corresponding service function to respond to the user input information, the corresponding service function activated based on the textual information.

9. An electronic device comprising:
   a processor; and
   a storage medium for tangibly storing thereon program logic for execution by the processor, the stored program logic comprising:
      logic, executed by the processor, for receiving user input information via a human-machine conversation interface,
      logic, executed by the processor, for displaying a response result, the response result generated based on the user input information and including a candidate function identifier for responding to the user input information, the candidate function identifier selected from one or more function identifiers,
      logic, executed by the processor, for receiving a second user input provided in response to the response result,
      logic, executed by the processor, for displaying a subset of the one or more function identifiers in response to the second user input, each of a subject of the one or more function identifiers associated with a service function for performing a respective action by a computing device, the service function determined based on the user input information and configured to respond to the user input information, and
      logic, executed by the processor, for determining a target function identifier based on a third user input, the target function identifier indicating a service function for responding to the user input information.

10. The electronic device of claim 9, the logic for displaying a response result comprising:
    logic, executed by the processor, for analyzing the user input information to obtain a system-specified service function corresponding to the user input information,
    logic, executed by the processor, for responding to the user input information based on the system-specified service function, and
    logic, executed by the processor, for displaying an output result generated by executing the system-specified service function.

11. The electronic device of claim 10, the logic for analyzing the user input information to obtain a system-specified service function comprising:
    logic, executed by the processor, for displaying at least one function identifier corresponding to a service function.

12. The electronic device of claim 11, the function identifier corresponding to a service function for analyzing the user input information to obtain the system-specified service function corresponding to the user input information.

13. The electronic device of claim 9, the second user input comprising information selected from the group consisting of:
    text information;
    voice information; and
    an operation of a user received at the human-machine conversation interface.

14. The electronic device of claim 13, the logic for displaying the function identifier in response to the second user input comprising:
    logic, executed by the processor, for, if the text information of the second user input comprises a specified phrase, displaying a function identifier designated by the specified phrase,
    logic, executed by the processor, for, if the voice information of the second user input comprises a specified sound, displaying a function identifier designated by the specified sound, and
    logic, executed by the processor, for, if the second user input comprises a specified operation of the user on the human-machine conversation interface, displaying a function identifier designated by the specified operation.

15. The electronic device of claim 9, the function identifier comprising textual information describing the service function corresponding to the function identifier, the textual information displayed near the function identifier.

16. The electronic device of claim 15, the logic for determining a target function identifier based on the third user input comprising:
    logic, executed by the processor, for receiving textual information input by a user, and
    logic, executed by the processor, for activating a corresponding service function to respond to the user input information, the corresponding service function activated based on the textual information.

17. A non-transitory computer-readable storage medium for tangibly storing computer program instructions capable of being executed by a computer processor, the computer program instructions defining steps of:
    receiving user input information via a human-machine conversation interface;
    displaying a response result, the response result generated based on the user input information and including a candidate function identifier for responding to the user input information, the candidate function identifier selected from one or more function identifiers;
    receiving a second user input provided in response to the response result;
    displaying a subset of the one or more function identifiers in response to the second user input, each of a subject of the one or more function identifiers associated with a service function for performing a respective action by a computing device, the service function determined based on the user input information and configured to respond to the user input information; and
    determining a target function identifier based on a third user input, the target function identifier indicating a service function for responding to the user input information.

18. The computer-readable storage medium of claim 17, the displaying a response result comprising:
    analyzing the user input information to obtain a system-specified service function corresponding to the user input information;
    responding to the user input information based on the system-specified service function; and
    responding to the user input information based on the system-specified service function.

19. The computer-readable storage medium of claim 18, the analyzing the user input information to obtain a system-specified service function comprising:
    displaying at least one function identifier corresponding to a service function.

20. The computer-readable storage medium of claim 19, the function identifier corresponding to a service function for analyzing the user input information to obtain the system-specified service function corresponding to the user input information.

* * * * *